(12) United States Patent
Kennedy et al.

(10) Patent No.: US 7,071,277 B2
(45) Date of Patent: Jul. 4, 2006

(54) POLY(CYCLOSILOXANE) COMPOSITION AND SYNTHESIS

(75) Inventors: Joseph P. Kennedy, Akron, OH (US); Pious Kurian, Aurora, IL (US)

(73) Assignee: The University of Akron, Akron, OH (US)

( * ) Notice: Subject to any disclaimer, the term of this patent is extended or adjusted under 35 U.S.C. 154(b) by 2 days.

(21) Appl. No.: 10/493,146

(22) PCT Filed: Oct. 16, 2002

(86) PCT No.: PCT/US02/32869

§ 371 (c)(1),
(2), (4) Date: Sep. 24, 2004

(87) PCT Pub. No.: WO03/033561

PCT Pub. Date: Apr. 24, 2003

(65) Prior Publication Data

US 2005/0065309 A1    Mar. 24, 2005

Related U.S. Application Data

(60) Provisional application No. 60/329,678, filed on Oct. 16, 2001.

(51) Int. Cl.
*C08G 77/06* (2006.01)
(52) U.S. Cl. .............................. 528/15; 528/31; 528/37
(58) Field of Classification Search .................. 528/15, 528/31, 37

See application file for complete search history.

(56) References Cited

U.S. PATENT DOCUMENTS 5,298,589 A * 3/1994 Buese et al. .................. 528/21

* cited by examiner

*Primary Examiner*—Margaret G. Moore (74) *Attorney, Agent, or Firm*—Roetzel & Andress; George W. Moxon, II (57) ABSTRACT

A poly(cyclosiloxane) is synthesized by oxidation with water in the presence of a Pt catalyst, followed immediately by polycondensation of the Si—OH groups to form Si—O—Si linkages. Thus, pentamethylcyclopentasiloxane can be polymerized into poly(pentamethycyclopentasiloxane).

13 Claims, 4 Drawing Sheets

POLY(CYCLOSILOXANE) COMPOSITION AND SYNTHESIS

CROSS-REFERENCE TO RELATED APPLICATIONS

The subject application claims the benefit and priority of U.S. patent application Ser. No. 60/329,678, filed Oct. 16, 2001.

The invention disclosed in this application was at least partially supported by the National Science Foundation under Grant Nos. 99-88808 and 00-80035. The U.S. Government may have certain rights to the invention herein.

TECHNICAL FIELD

This invention relates generally to the synthesis of new poly(cyclosiloxane) compositions and networks. More particularly, the present invention relates to the polymerization of pentamethylcyclopentasiloxane.

BACKGROUND OF THE INVENTION

Many cyclic polysiloxanes, including pentamethylcyclopentasiloxane (sometimes referred to hereinafter as $D_5H$) have been commercially available for a number of years. At one time, these materials seemed promising for use in medical applications. They are known to be useful as crosslinkers in silicone coatings and encapsulating materials used in the electronic industry, as well as for other electronic applications, such as composites and adhesives. Hence, synthetic methods therefor are known in the art.

For example, Haines, et al, U.S. Pat. No. 5,395,956, discloses a process for the synthesis of organohydrogensiloxanes, namely cyclic organohyddrogensiloxanes. An hydrozylate intermediate is rearranged via an acidic rearrangement catalyst, such as a sulfonated divinylbenzenestyrene copolymer resin, to form a cyclic organohydrogensiloxane having the formula where n=3 to 12. As noted in the patent, such polysiloxanes are known in the art, but this process for its production provides minimal loss of siloxanes due to crosslinking of the siloxanes to high molecular weight byproducts. Accordingly, cyclic polysiloxanes such as pentamethylcyclopentasiloxane are known, but the industry has yet to derive poly(cyclosiloxanes) therefrom.

However, crosslinking different derivatives of cyclic polysiloxanes is known in the art. In particular, Loo, U.S. Pat. No. 5,334,688, discloses a crosslinked polymer or crosslinkable prepolymer, which is the hydrosilation reaction product of a cyclic polysiloxane, an organosilicon compound having at least two Si—H groups, and an optional third ingredient, an aromatic polyene having at least one carbon-carbon double bond. In Loo, U.S. Pat. No. 5,373,077, the divisional of the '688 patent, the aromatic polyene is a required ingredient. These crosslinked polymers, while technically polycyclosiloxanes, are limited to hydrosilation reactions between cyclic polysiloxanes having the formula wherein R is a saturated, substituted or unsubstituted alkyl or alkoxy group or a substituted or unsubstituted aryl or aryloxy group, $R^1$ is a substituted or unsubstituted hydrocarbon group having at least one nonaromatic carbon-carbon double bond reactive via hydrosilation, and n is 3 or 4; and cyclic polysiloxanes having at least two Si—H groups. However, these compositions are prepared only by way of a hydrosilation reaction wherein a Si—H group reacts with a vinyl or allyl group to provide the Si—O—Si linkages.

Similarly, other multiple component networks (MCNs) have also been prepared. For example, commonly owned U.S. application Ser. No. 09/833,774 discloses multicomponent networks comprising the reaction product of a plurality of multifunctional, allyl-terminated polyethylene glycols linked to a plurality of multifunctional siloxanes having at least two SiH moieties for each siloxane. These multiple component networks (MCNs) as well as the more traditional interpenetrating polymer networks (IPNs) should be distinguished from single component networks or polymerization products that are random aggregates of condensed cyclic siloxanes comprising a great variety of linearly and three dimensionally connected and crosslinked rings. An MCN is defined as a single elastomeric network comprising at least two chemically different covalently-bonded sequences while an IPN consists of two or more unlinked, independent networks Thus, the need continues to exist for a single component polymer, i.e., a homopolymer, comprising a single polymeric species—namely a particular cyclic polysiloxane, networked in three dimensions to form a poly(cyclosiloxane).

SUMMARY OF THE INVENTION

Broadlly, the present invention is directed towards the synthesis of a single component, cyclic siloxane-based polymer network. More particularly, a poly(cyclosiloxane) network composition, preferably poly(pentamethylcyclopentasiloxane), is synthesized. It has been found that such network compositions, such as poly(pentamethylcyclopentasiloxane), have an extremely low glass transition temperature (Tg) and exhibit an unprecedented combination of properties. Poly(pentamethylcyclopentasiloxane) has been found to be a stiff brittle solid, to be insoluble in common solvents, and to fail to exhibit a melting endotherm, yet has an extremely low Tg, and is thermally stable up to at least 700° C.

The advantages of the invention over the known art relating to polymeric compositions and networks, which shall become apparent from the specification that follows, are accomplished by the invention as hereinafter described and claimed.

In general, the present invention may be achieved by a poly(cyclosiloxane) network composition comprising cyclosiloxane moieties having the formula wherein each R is the same or different for each cyclosiloxane moiety and is selected from the group consisting of a hydrogen, an alkyl group, an aryl group, and a cycloalkyl group, and wherein n is an integer from 3 to 8; wherein each $R^2$ is either hydrogen or oxygen provided that when $R^2$ is an oxygen it is bonded to another cyclosiloxane moiety; and wherein each cyclosiloxane moiety is bound to at least two other cyclosiloxane moieties via Si—O—Si functionalities.

Other aspects of the present invention may be achieved by providing a poly(cyclosiloxane) network composition comprising the polymerization reaction product of a plurality of cyclosiloxane moieties having the formula wherein each R is the same or different for each cyclosiloxane moiety and is selected from the group consisting of a hydrogen, an alkyl group, an aryl group, and a cycloalkyl group, wherein n is an integer from 3 to 8 and wherein each cyclosiloxane moiety is bound after polymerization to at least two other cyclosiloxane moieties via Si—O—Si functionalities.

Still other aspects of the present invention may be achieved by providing a process for the preparation of a poly(cyclosiloxane) network composition comprising providing cyclosiloxane moieties having the formula wherein each R is the same or different for each cyclosiloxane moiety and is selected from the group consisting of a hydrogen, an alkyl group, an aryl group, and a cycloalkyl group, and wherein n is an integer from 3 to 8; oxidizing each cyclosiloxane moiety with water in the presence of a Pt catalyst to form at least two Si—OH groups from the Si—H groups present on each ring and immediately thereafter condensing the cyclic rings such that the SiOH groups on each ring react to provide Si—O—Si linkages between the cyclosiloxane moieties to form a poly(cyclosiloxane) network composition.

It will be appreciated that, in a particular embodiment of the present invention, n equals 5 and R is a methyl group. In that instance, each cyclosiloxane moiety is pentamethylcyclopentasiloxane and the polymerization reaction product is poly(pentamethylcyclopentasiloxane), sometimes referred to hereinafter a $PD_5$.

DETAILED DESCRIPTION OF THE INVENTION

As disclosed hereinabove the present invention is directed toward the synthesis of poly(cyclosiloxane) compositions and, more particularly, toward the polymerization of cyclic polysiloxanes having the formula wherein each R is the same or different for each siloxane moiety and is selected from the group consisting of a hydrogen, a substituted or unsubstituted alkyl group, a substituted or unsubstituted aryl group, and a substituted or substituted cycloalkyl group, and wherein n is an integer from 3 to 8. Such a composition provides a biocompatible, single-ingredient network having extremely good thermal stability, resistance to harsh chemical environments and a uniquely low glass transition temperature.

Preferably, the compositions formed are poly(methylcyclohydrosiloxanes). Thus the R in the formula II above is a methyl group. A preferred cyclic polysiloxane is pentamethylcyclopentasiloxane. Other examples of preferred cyclic polysiloxanes include, by way of example, trimethylcyclotrisiloxane, tetramethycyclotetrasiloxane, and hexamethylcyclohexasiloxane.

It will be appreciated, however, that the cyclic polysiloxanes of the present invention can be substituted or unsubstituted. Thus, any alkylcyclohydrosiloxane can be employed, including hydrocarbon substituted cyclopentasiloxanes. It is believed and anticipated that any cyclic or aryl hydrocarbon substituted or unsubstituted cyclopolysiloxane can be polymerized as well by the synthesis provided below. Examples of aryl cyclosiloxanes include, for example, pentaphenylcyclopentasiloxane, or hydrocarbon substituted aryl cyclopentasiloxane. Examples of cyclic deratives include tritolylcyclotrisiloxane, and pentatolylcyclopentasiloxanes. Cyclic alkyl substituted cyclosiloxane derivatives include, for example, tri(cyclohexyl)cyclotrisiloxane, or penta(cyclohexyl) cyclopentasiloxanes.

Polymerization of these cyclic polysiloxanes is conducted by oxidation of the SiH group on the cyclosiloxane moiety to form SiOH groups and followed immediately by condensation of the cyclic ring to form complex aggregates of cyclosiloxane moieties. More particularly, it is believed that the Si—OH groups are condensed to Si—O—Si to form Si—O—Si linkages between the cyclosiloxane rings.

Polymerization of these cyclic polysiloxanes by oxidation and polycondensation is conducted in the presence of a platinum-containing catalyst and water. Only a very small amount of water, whose molar concentration is equal to or less than the molar concentration of the Si—H groups in the system, is necessary for the reaction to occur.

The reaction may be conducted with or without solvents. When solvents are employed, it may be any typical aromatic, solvent including, by way of example, benzene, xylene, toluene, hexane, cyclohexane, heptane, cycloheptane, and the like. The most preferred solvent is toluene.

The catalyst may be any platinum-based catalyst system, including a Karstedt's system (a platinum divinyl complex in toluene or xylene, such as is available from United Chemical Technologies); chloroplatinic acid in isopropanol, bis(acetonitrile)platinum dichloride, bis (benzonitrile) platinum dichloride, platinum on carbon, platinum dichloride, cyclooctadieneplatinum dichloride, dicyclopentadieneplatinum dichloride and metallocene platinum systems. The platinum catalyst is present in an amount of 0.0005% to 0.10% by weight of platinum, based on the weight of the monomers, preferably 0.001% to 0.05%, and most preferably 0.005% to 0.01%. Most preferred is the Karstedt catalyst, Pt$_2$\{[(CH$_2$=CH)Me$_2$Si]$_2$O\}$_3$. A tin-containing catalyst such as tin octanoate may also be used as a catalyst. Likewise, other metal-containing complexes, for example, titanium complexes, zirconium complexes and rhodium complexes, may be used as suitable catalysts.

Scheme I hereinbelow shows the chemical polymerization reaction where the monomer is pentamethylcyclopentasiloxane (D$_5$H). The resultant poly(pentamethylcyclopentasiloxane) is shown in Scheme I as PD$_5$. It will be appreciated that PD$_5$ shows only a representative microarchitecture of the polymer, and that the present invention should not be limited to this one polymer, it being understood that the present invention, as envisioned, includes other cyclic polysiloxanes of the same or similar microstructure as D$_5$H.

SCHEME 1

As shown in Scheme I, the polymerization starts by the interaction between $D_5H$ and $Pt/H_2O$, a reaction in which the monomer is converted to an intermediate of cyclopentane-siloxane rings in which some of the SiH groups have been converted to SiOH groups. Gaseous hydrogen is evolved during the production of this intermediate, which has not been isolated. As noted hereinbelow, according to Raman spectroscopy under the conditions employed, an average of three Si—H groups per $D_5H$ ring have been converted to Si—O—Si crosslinks. This Pt catalyzed oxidation in the presence of water ($SiH+H_2O \rightarrow SiOH+H_2$) is believed to produce gaseous $H_2$ that leads to an intense bubbling observed during the initial phases of the synthesis. This energetically strongly favored conversion is driven by the formation of strong Si—O bonds from relatively weaker Si—H linkages and by the entropy gain of gaseous $H_2$ evolution. The cyclosiloxane intermediate carrying an average of three Si—OH groups immediately starts to undergo polycondensations. Obviously, oxidation of Si—H and polycondensation of SiOH proceed simultaneously, a theory supported by the inability to isolate the cyclopentanesiloxane intermediate, as discussed hereinbelow. The water used for the oxidation is recovered by condensation (2 Si—OH→Si—O—Si+$H_2$O). The final product is a random aggregate of condensed cyclosiloxanes comprising a great variety of linearly connected and crosslinked rings.

In order to demonstrate practice of the present invention, the following experiments were carried out. The following are illustrative of the nature of the present invention and should not necessarily be construed as limiting the scope of the invention. Other materials and processing steps or conditions may be substituted as is known in the art for those materials, steps or conditions described herein, it being understood that the scope of the invention continues to reside in the invention as hereinafter claimed.

Initially, the synthesis of poly(pentamethylcyclopentasiloxane) ($PD_5$) was accomplished through the polymerization of pentamethylcyclopentasiloxane ($D_5H$). Polymerization of this single component $PD_5$ network was undertaken in a one neck, round bottom flask under conventional conditions in air under laboratory hoods, without any special equipment or precautions. In particular, 2 mL of $D_5H$, a colorless viscous liquid, and 2 mL of toluene (obtained from commercial sources) were placed in the 100 mL round bottom flask containing a Teflon coated magnetic stirring bar, and the charge was stirred in an oil bath at 100° C. Polymerization of the cyclic polysiloxane was induced by adding about 20 μL of a Karstedt's catalyst (Pt with 1,3-divinyltetramethyldisiloxane in xylene solution) to the stirred charge, followed a few seconds later by the introduction of a drop (~0.3 mL) of water.

Soon after the addition of these ingredients, the colorless liquid charge started to bubble intensely. This is believed to have been caused by the evolution of hydrogen gas. Bubbling continued for about 1 hour after which the intensity of bubbling diminished. The viscosity of the charge gradually increased and, after a few hours, stirring became impossible. The highly viscous gel was placed in the hood over night (to remove most of the solvent) and subsequently dried in a vacuum oven at room temperature for two days. This procedure yielded colorless faintly opaque brittle flakes. In order to speed up or accelerate the reaction and reduce the processing temperature, the system could alternatively be sonicated using, for example, an ultrasound bath.

In a second experiment, $PD_5$ was be synthesized from $D_5H$ in the absence of the solvent. Specifically, the solvent-free synthesis of $PD_5$ was conducted wherein aliquots (typically 2 mL) of $D_5H$ were stirred in a round bottom flask at 100° C., and a Karstedt's catalyst (Pt) and, soon thereafter, a drop of water (about 0.3 mL) was again added. Bubbling started immediately again and was observed for about 30 to 60 minutes. Gradually, the bubbling subsided and stirring stopped because the viscosity of the system had increased substantially. A transparent colorless brittle material was obtained that was dried in the hood and, subsequently, in the vacuum oven for two days at ambient temperatures.

Several tests were then performed on the resulting brittle, colorless, flaky powder material, some of which were used to characterize the polymer. For instance, efforts were made to compression mold the material. Thus, the powdery samples of $PD_5$ were heated in a laboratory (Craver) press for about 10 minutes at 15 tons of pressure and at a temperature of about 300° C. There was no evidence of flow of any of the samples which retained their brittle powder consistency.

The water uptake/absorption of the samples were also determined. Well dried $PD_5$ samples comprising a few large flakes of the sample dried under vacuum for about one week at room temperature (about 23° C.) were weighed, placed in water and heated to about 70° C. After one week of soaking, the flakes were filtered, thoroughly blotted with paper towels and weighed again. The water uptake was calculated from the weight increase with the average increase being about 3 weight percent. (See Table I).

Figure 2:
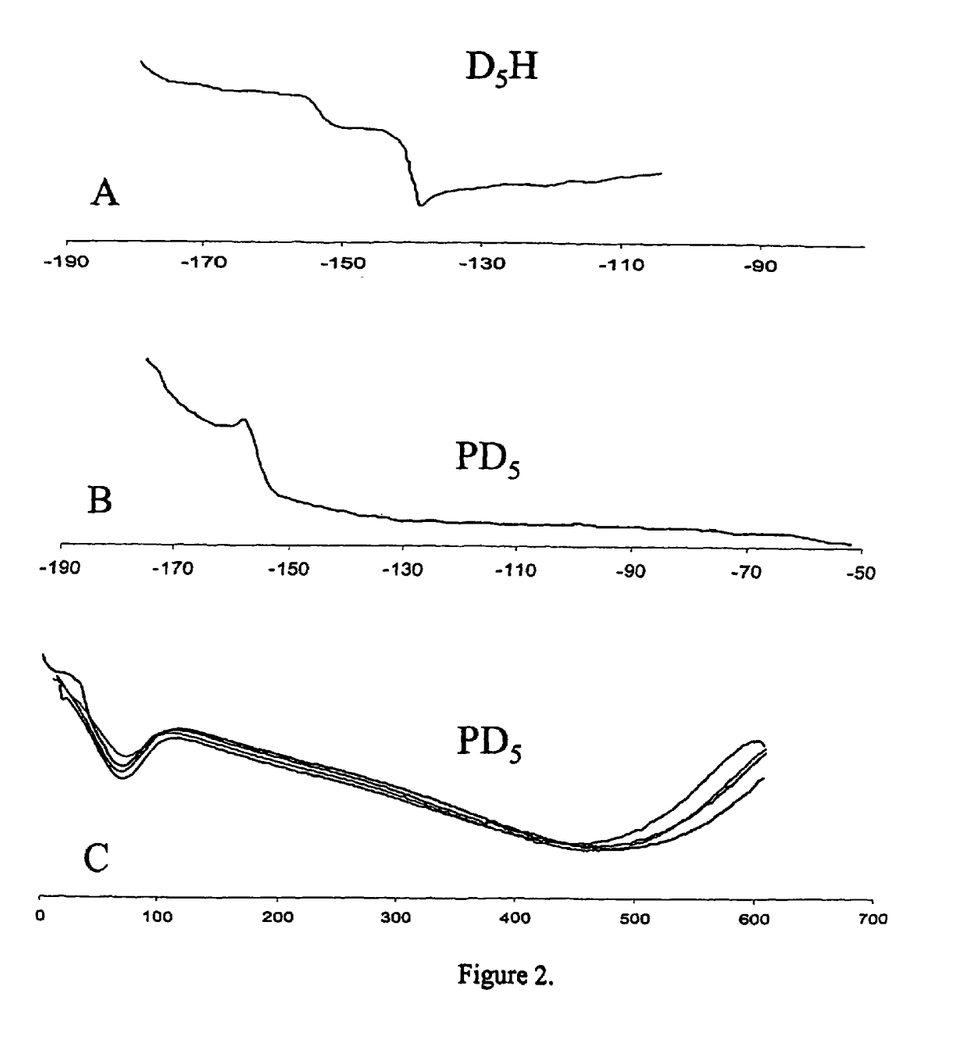
FIGS. 2A, 2B, and 2C are representative graphs of the differential scanning calorimetry (DSC) traces of $D_5H$, $PD_5$ (in the range of −200 to +50° C.) and $PD_5$ (in the range of 0 to 600° C.), respectively.

Instrumental techniques were then used to characterize the polymer. The melting point and glass transition temperature (Tg) of the $PD_5$ polymer was determined by differential scanning calorimetry (DSC). This test was carried out by a DuPont 2100 Thermal Analyzer under a nitrogen atmosphere. The samples were placed in aluminum containers and cooled to about -200° C. DSC thermograms were obtained by heating the samples 10° C. per minute. Melting points were obtained as the minima of DSC scans, while the mid-point method gave glass transition temperature. Averages of at least three trials are reported in Table I, while FIG. 2 shows representative resultant scans.

TABLE I

| Selected Properties of $PD_5$ | |
| --- | --- |
| Visual appearance: | Colorless, brittle flakes, powders |
| Solubility: | Insoluble in common organic solvents |
| Water uptake/absorption: | 3% by weight |
| Tg (° C.): | -151 +/- 6° C. by DSC; -125 +/- 20 by Brillouin scattering |
| Permeability: | Permeable to oxygen |
| Thermal decomposition (TGA): | No significant weight loss up to 700° C. |

Thermal Gravimetric Analysis (TGA) was obtained with a DuPont TA instrument, Hi-Res TGA 2950. Samples for this test were heated under nitrogen from room temperature (about 23° C. to about 700° C. at a rate of about 10° C./minute. According to the results of TGA studies, the $PD_5$ samples were extremely thermally stable, with no significant weight loss or decomposition up to at least about 700° C. in the nitrogen atmosphere.

Raman spectra were obtained by the use a Jobin Yvon T64000 triple monochromator. Brillouin scattering spectra were obtained by a tandem-interferometer (Sandercock model). Both, Raman and Brillouin spectra were obtained in back-scattering geometry with an $Ar^{++}$ laser as an excitation source, $\lambda$=514.5 nm, and 50 mW power on the samples. The overall chemical compositions were obtained by analysis of Raman scattering spectra.

Figure 1:
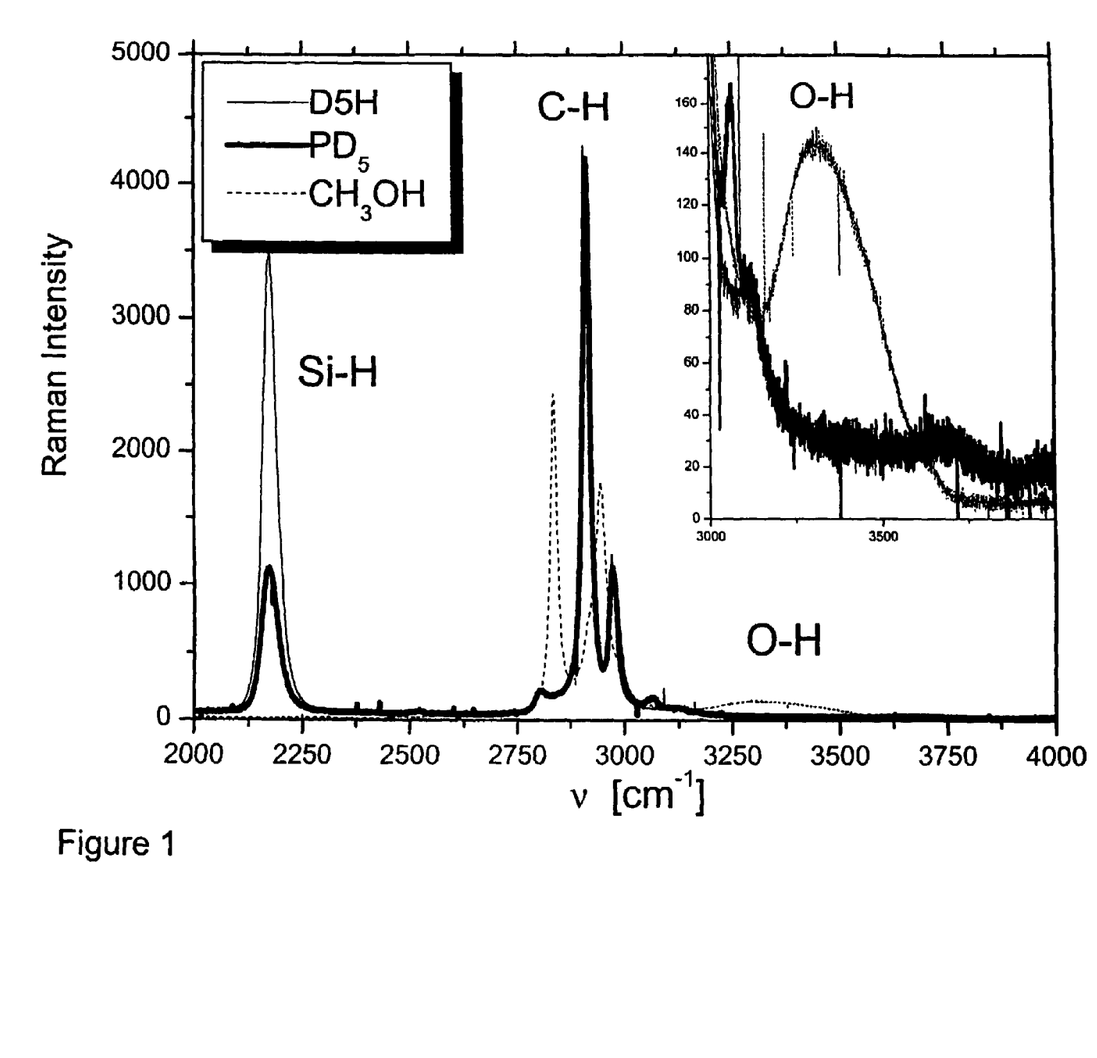
FIG. 1 is a representative graph of the Raman spectra of pentamethylcyclopentasiloxane ($D_5H$), poly(pentamethylcyclopentasiloxane) ($PD_5$), and methanol as a reference, with the spectra normalized to the integrated intensity of the C—H vibrational modes.

More particularly, structural analysis of $PD_5$ polymers was carried out by Raman scattering, which, like IR spectroscopy, provides molecular vibration information. Each chemical bond possesses a characteristic frequency of vibrations and the concentration of specific chemical bonds can be determined by mode analysis. FIG. 1 shows the Raman spectra of $D_5H$, $PD_5$ and methanol as a reference. The spectra are normalized to the integrated intensity of C—H modes. The mode at about 2200 $cm^{-1}$ corresponds to the vibration of the Si—H bond. The modes in the 2750–3000 $cm^{-1}$ range correspond to different C—H vibrations, and those in the 3200–3700 $cm^{-1}$ (see inset of FIG. 1) range correspond to O—H vibrations.

As shown in FIG. 1, the C—H modes of $D_5H$ and $PD_5$ $PD_5$ are essentially identical, suggesting that the methyl groups did not get distorted in the polymer. Assuming that the number of methyl groups did not change during the polymerization, the changes in the number of Si—H bonds can be determined. The integrated intensity of the Si—H mode in $PD_5$ relative to that in $D_5H$ decreased to about 0.4±0.05, which indicates that an average of three out of the five Si—H bonds per $D_5H$ ring have disappeared during polymerization.

The Raman spectrum of $PD_5$ does not indicate changes in the O—H vibration range. By comparing the integrated intensities above 3200 $cm^{-1}$, it is estimated that the number O—H bonds is less than 0.02 per methyl group. Thus the number of O—H bonds in the polymer is negligible, if not zero, which indicates a substantial absence of dangling —OH end groups.

According to these results, an average of three out of five Si—OH bonds per $D_5H$ ring has been converted to Si—O—Si bonds during the polymerization. Rings may carry one to four Si—H groups; at present the number of Si—H functions per ring cannot be determined precisely. Importantly, however, the average functionality of the rings is three which gives rise to a three-dimensional network.

Based upon the results of the characterization of these polymers, it will be appreciated that the sequence of events in the reaction and the polymer microstructure itself are important for devising processing strategies for the production of this polymer. For instance, mixing the $D_5H$ monomer with the Pt catalyst and water at room temperature or below, and quickly pouring the system into molds can produce shaped objects of $PD_5$. Polymerization can be accelerated by heating to 100° C. or above. Annealing by heat soaking may also help to increase the overall molecular mass of the final product.

The process yields optically clear transparent stiff to brittle materials. This method may be used to compression mold the $PD_5$ polymer of the present invention into any of a number of useful articles, including, for example, biocompatible membranes for use in conjunction with silicone rubber articles. It should be noted again that heating of powdery samples of $PD_5$ in a Craver laboratory press for 10 minutes at 15 tons and 300° C. did produce not show evidence of flow and the samples retained their brittle powdery consistency.

Interestingly, there is a dearth of information on the melting point (Tm) of $D_5H$ in the scientific literature. The Gelest catalogue lists Tm, $D_5H$=−108° C. According to our DSC studies, the melting endotherm of $D_5H$, shown in FIG. 2, indicates Tm, $D_5H$=−137.6±1.0° C., which is an average of five determinations.

The glass transition temperatures (Tg) of the monomer and polymer were tested to be Tg, $D_5H$=−152±2° C. and Tg, $PD_5$=−151±6° C., respectively. The average of four determinations for monomer and polymer is shown in FIG. 2. The repeatability of the heating and cooling cycles in scans A and B were excellent and therefore only one trace is shown. For $PD_5$ in the 0 to 600° C. range, reproducible traces were obtained after the $6^{th}$ heating/cooling cycle. FIG. 2C shows heating scans 7–10. The origin of the transition at about 80° C. is obscure, as well as the ascending portion of the scans above about 500° C.

The very low Tg of $PD_5$ is indeed surprising and unprecedented. A recent publication by Nakamura, entitled "Which Polymer Has the Lowest Tg?" identifies polydiethylsiloxane (PDES) with the lowest Tg among polyorganosiloxanes. Sources cited therein variously fix Tg, PDES at −143° C. or −133° C. by DSC. In either case, these Tg values are indeed lower than that of PDMS (Tg, PDMS=−123° C.), commonly regarded as having the lowest Tg among polymers. According to repeated DSC determinations, the Tg of $PD_5$ is below that of even PDES by about 10° C.

While not wishing to be bound by any particular theory, it is believed that the very low Tg of PDMS is most likely due to the large number of rotational conformers of the two methyl groups per repeat unit in the chain, the rotation of which is relatively unhindered on account of the large free volume in PDMS. Accordingly, it is believed that the low Tg of $D_5H$ is due also to the existence of the many conformers and rotamers in this molecule. The Tg of $PD_5$ is not much different from that of its monomer, which is not an unusual occurrence. Evidently, the increased number of conformers prevailing in $PD_5$ compensates for the loss of translational entropy due to the polymerization of $D_5H$.

Brillouin scattering provided elastic constants (sound velocity) and mechanical relaxation at GHz frequencies. The $D_5H$ and $PD_5$ samples were placed in vacuum tight ampoules. $PD_5$ films were placed between two sapphire windows to ensure good thermal contact. PDMS as a reference material was also determined. Brillouin measurements were performed at different temperatures with cooling and heating rates of 0.6° C./minute. Computer software was prepared to control the heating and cooling cycles of the experiments. The data obtained by cooling agreed well with those obtained by heating, i.e., significant hysteresis was not observed during the slow temperature changes used.

This technique analyzes the scattering of light by acoustic waves propagating in a material. For a given scattering angle Θ, the frequency of the Brillouin peak $v_0$ is proportional to the sound velocity V in the material:

$$v_o = \frac{2nV}{\lambda} \operatorname{Sin}\left(\frac{\theta}{2}\right)$$

where n is the refractive index whose variation with the temperature is usually negligible. The main variation of frequency $v_0$ is related to changes in the sound velocity which in turn is directly related to the elastic modulus $K=V^2/\rho$, where $\rho$ is the density of the material. The spectra were fitted by using the standard expression for a damped harmonic oscillator:

$$I(v) \propto \frac{\Gamma}{(v^2 - v_0^2)^2 + (2v\Gamma)^2}$$

where Γ is the width of the Brillouin scattering which is proportional to the damping of the sound wave at a given frequency.

Figure 3:
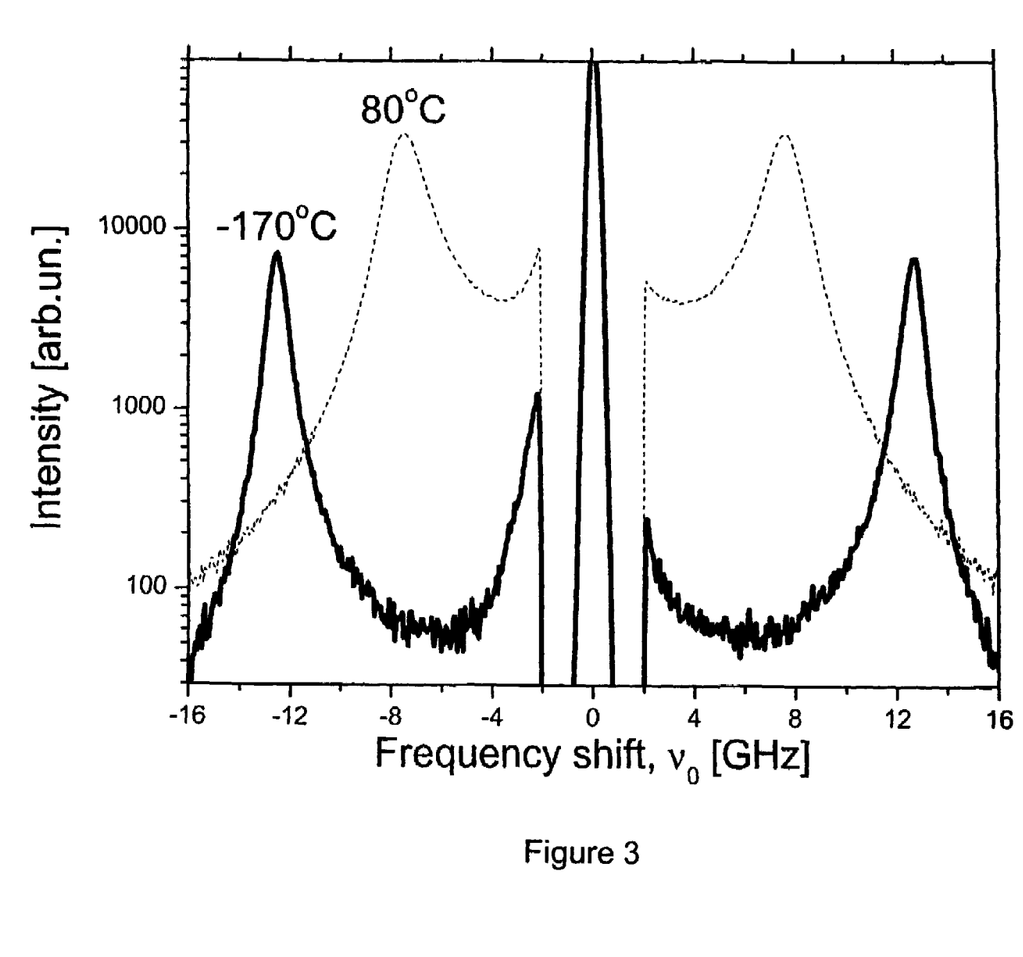
FIG. 3 is a representative graph of the Brillouin spectrum of PD$_5$ at −170° C. and 80° C.

FIG. 3 shows the Brillouin spectra of $PD_5$ at −170 and 80° C. The Brillouin peaks have shifted by a frequency ±$v_0$ from the laser line centered at zero. A difference in the frequency $v_0$ and width of the peaks Γ can be clearly seen.

Figure 4:
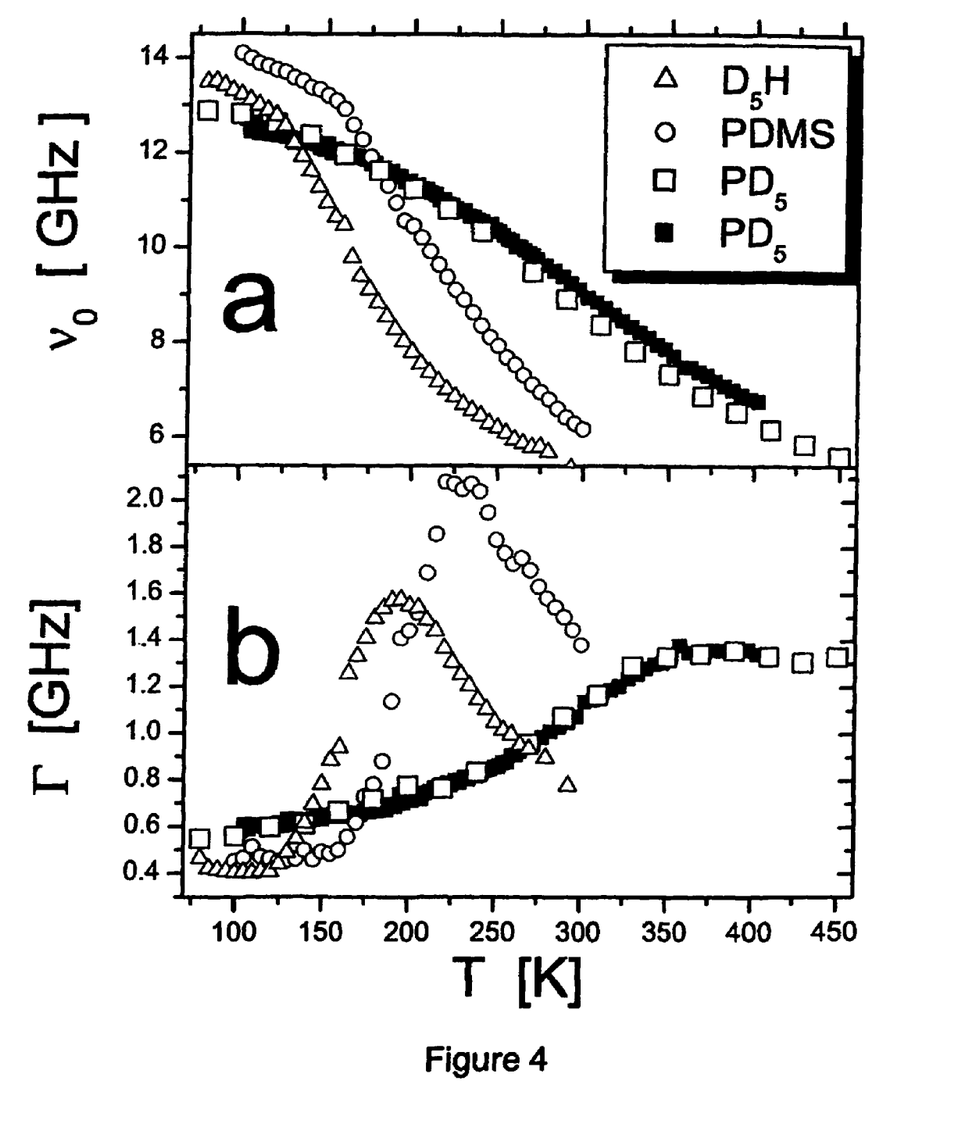
FIGS. 4A and 4B are representative graphs comparing the temperature variation of $v_0$ and $\Gamma$, respectively, of Brillouin peaks in D$_5$H, PDMS, and PD$_5$ (one prepared in solution, the other prepared in bulk).

FIG. 4 presents the temperature variation of $v_0$ and Γ for $D_5H$ and two $PD_5$ samples. The data for the two polymer samples, one prepared in solution, the other in bulk, are consistent within experimental variation. The data for PDMS are also shown for comparison. The Tgs can be estimated from the changes in the slopes of temperature variations of $v_0$ and Γ. For $D_5H$ and PDMS the temperature strongly influences $v_0$ and Γ and the glass transitions can be clearly observed. Above the Tg, the elastic modulus decreases and the relaxation increases which leads to a strong decrease in $v_0$ and a sharp increase in Γ. In contrast, for $PD_5$, both $v_0$ and Γ show a gradual slow decrease over the entire temperature range and a distinct glass transition cannot be discerned. Such a broad range of glass transitions is usually observed with covalently bonded so-called "strong" glass-forming systems. The term "strong" was coined by C. A. Angell. It will be appreciated that as used herein, the term "strong" indicates that the system strongly resists temperature damages, i.e., the temperature has to be increased far above the Tg to reach the low viscosity (liquid) state and short relaxation times. Silica glass is a traditional example for such strong glass-forming systems.

In FIG. 4B, $PD_5$ shows a strong shift of $\Gamma$ toward high temperatures. The maximum $\Gamma$ appears when $2\pi\tau\nu_0=1$, where $\tau$ is a characteristic relaxation time that dampens acoustic modes. In polymers a maximum $\Gamma$ usually appears at temperatures ($T_{max}$) not far above Tg. Indeed, according to the data in FIG. 4B, $T_{max}$ is approximately 1.45 Tg for PDMS, and $T_{max}$ is about 1.6 Tg for $D_5H$. The maximum $\Gamma$ for $PD_5$, however, appears at a significantly higher temperature, $T_{max}$ of about 2.6 Tg. These data indicate a very slow change of relaxation time $\tau$ with temperature, a characteristic behavior of strong glass-forming systems.

Brillouin scattering has also been used to generate Tg information data for the monomers and polymers of the present invention. For example, Tg, $D_5H=-150\pm5°$ C. and Tg, $PD_5=-125\pm20°$ C. The larger error for $PD_5$ is due to extremely smooth transitions. The agreement between the Tg values obtained by DSC and Brillouin scattering is excellent for $D_5H$, and is considered within experimental error for $PD_5$.

Based upon the foregoing disclosure, it should now be apparent that the use of the components described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the described invention.

What is claimed is:

1. A poly(cyclosiloxane) network composition comprising:
repeating cyclosiloxane moieties having the formula wherein each R is the same or different for each cyclosiloxane moiety and is selected from the group consisting of a hydrogen, an alkyl group, an aryl group, and a cycloalkyl group, and wherein n is an integer from 3 to 8; wherein each $R^2$ is either hydrogen or oxygen provided that when $R^2$ is an oxygen it is bonded to another cyclosiloxane moiety; and wherein each cyclosiloxane moiety is bound to at least three other cyclosiloxane moieties via Si—O—Si functionalities.

2. The poly(cyclosiloxane) network composition according to claim 1, wherein $R=CH_3$.

3. The poly(cyclosiloxane) network composition according to claim 1, wherein n=5.

4. The poly(cyclosiloxane) network composition according to claim 1, herein the glass transition temperature of the poly(cyclosiloxane) network is $-151\pm-6°$ C.

5. A poly(cyclosiloxane) network composition comprising:
the polymerization reaction product of a plurality of cyclosiloxane moieties having the formula wherein each R is the same or different for each cyclosiloxane moiety and is selected from the group consisting of a hydrogen, an alkyl group, an aryl group, and a cycloalkyl group, wherein n is an integer from 3 to 8 and wherein each cyclosiloxane moiety is bound after polymerization to at least two other cyclosiloxane moieties via Si—O—Si functionalities.

6. The poly(cyclosiloxane) network composition according to claim 5, wherein n=5.

7. The poly(cyclosiloxane) network composition according to claim 5, wherein R=CH3.

8. The poly(cyclosiloxane) network composition according to claim 5, wherein each cyclosiloxane moiety is bound to exactly three other cyclosiloxane moieties.

9. The poly(cyclosiloxane) network composition according to claim 5, wherein the glass transition temperature of the poly(cyclosiloxane) network is $-151\pm-6°$ C.

10. A process for the preparation of a poly(cyclosiloxane) network composition comprising providing cyclosiloxane moieties having the formula wherein each R is the same or different for each cyclosiloxane moiety and is selected from the group consisting of a hydrogen, an alkyl group, an aryl group, and a cycloalkyl group, and wherein n is an integer from 3 to 8; oxidizing each cyclosiloxane moiety with water in the presence of a Pt catalyst to form at least two Si—OH groups from the Si—H groups present on each ring and immediately thereafter condensing the cyclic rings such that the SIOH groups on each ring react to provide Si—O—Si linkages between the cyclosiloxane moieties to farm a poly(cyclosiloxane) network composition.

11. The process according to claim 10, wherein R=CH$_3$.

12. The process according to claim 10, wherein n=5.

13. The process according to claim 10, wherein no Si—OH functional groups remain.

* * * * *